United States Patent
Hsieh et al.

(10) Patent No.: US 10,701,794 B2
(45) Date of Patent: Jun. 30, 2020

(54) PRINTED CIRCUIT BOARD AND POWER COPPER SURFACE CONFIGURATION METHOD THEREOF

(71) Applicant: PEGATRON CORPORATION, Taipei (TW)

(72) Inventors: Yang-Chih Hsieh, Taipei (TW); Cheng-Hui Chu, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

(21) Appl. No.: 16/660,608

(22) Filed: Oct. 22, 2019

(65) Prior Publication Data

US 2020/0137878 A1 Apr. 30, 2020

(30) Foreign Application Priority Data

Oct. 26, 2018 (TW) .............................. 107137888 A
Aug. 2, 2019 (TW) .............................. 108127542 A

(51) Int. Cl.
*H05K 1/02* (2006.01)
*H05K 1/09* (2006.01)
*G06F 30/392* (2020.01)

(52) U.S. Cl.
CPC ......... *H05K 1/0215* (2013.01); *G06F 30/392* (2020.01); *H05K 1/09* (2013.01)

(58) Field of Classification Search
CPC ....... H05K 1/0215; H05K 1/09; G06F 30/392
USPC ................................................... 174/78, 257
See application file for complete search history.

(56) References Cited

U.S. PATENT DOCUMENTS

| | | | | |
|---|---|---|---|---|
| 4,984,132 A | * | 1/1991 | Sakurai | H01L 23/50 361/794 |
| 5,736,796 A | * | 4/1998 | Price | H05K 1/0262 307/147 |
| 5,886,406 A | * | 3/1999 | Bhansali | H01L 23/50 257/691 |
| 2006/0055049 A1 | * | 3/2006 | Nelson | H01L 23/49838 257/774 |
| 2010/0321910 A1 | * | 12/2010 | Hsu | H05K 1/0231 361/782 |

FOREIGN PATENT DOCUMENTS

| | | |
|---|---|---|
| CN | 102324838 | 1/2012 |
| CN | 104467368 | 3/2015 |

* cited by examiner

*Primary Examiner* — Sherman Ng
(74) *Attorney, Agent, or Firm* — J. C. Patents

(57) ABSTRACT

A printed circuit board and a power copper surface configuration method are provided. The method includes the following steps: configuring a first power supply component, a second power supply component, a power sink component, a convergence copper surface portion, a first grounding copper surface portion and a second grounding copper surface portion; determining whether currents of the first and second power supply components flow to the power sink component through the convergence copper surface portion; when the currents of the first and second power supply components flow to the power sink component through the convergence copper surface portion, determining whether the convergence copper surface portion conforms to a current balancing design of the printed circuit board according to at least one of first and second tolerable difference values and an average current. When the convergence copper surface portion conforms to the current balancing design, the method is ended.

15 Claims, 10 Drawing Sheets

PRINTED CIRCUIT BOARD AND POWER COPPER SURFACE CONFIGURATION METHOD THEREOF

CROSS-REFERENCE TO RELATED APPLICATION

This application claims the priority benefit of Taiwan application serial no. 107137888, filed on Oct. 26, 2018, and Taiwan application serial no. 108127542, filed on Aug. 2, 2019. The entirety of each of the above-mentioned patent applications is hereby incorporated by reference herein and made a part of this specification.

BACKGROUND

1. Technology Field of the Invention

The present invention relates to a printed circuit board, in particular, to a printed circuit board and a power copper surface configuration method thereof.

2. Description of Related Art

In a printed circuit board, the power network transmission design is roughly divided into three portions, namely a power supply component, a transmission passage and a power sink component. When it is designed that a plurality of power supply components are connected to the same power sink component, a printed circuit board layout engineer determines placement positions of the power supply components and the power sink component based on factors such as an institutional need and the magnitude of a load current, and connects the power supply components to the power sink component by power copper surfaces.

However, due to different layout routes, the equivalent resistances of channels the respective power supply components to the same power sink component may be different, and the equivalent resistances include the power copper surfaces serving as the channels, tandem connection components and the like. Under the condition that output voltages of the power supply components are the same, when the equivalent resistances of the channels from the respective power supply components to the same power sink component are different, output currents of the respective power supply components may not be uniform, i.e., loads of the power supply components are unequal.

SUMMARY

The present invention provides a printed circuit board and a power copper surface configuration method thereof, which can avoid or suppress the non-uniform condition of output currents of power supply components.

The printed circuit board of the present invention includes a first power supply component, a second power supply component, a power sink component, a first power copper surface portion, a second power copper surface portion, a third power copper surface portion, a convergence copper surface portion, a first grounding copper surface portion and a second grounding copper surface portion. The first power copper surface portion is electrically connected to the first power supply component. The second power copper surface portion is electrically connected to the second power supply component. The third power copper surface portion is electrically connected to the power sink component. The convergence copper surface portion is electrically connected to the first power copper surface portion, the second power copper surface portion and the third power copper surface portion. Currents provided by the first power supply component and the second power supply component flow to the convergence copper surface portion via the first power copper surface portion and the second power copper surface portion respectively, and then flow to the power sink component via the convergence copper surface portion. The first grounding copper surface portion is electrically connected to the first power supply component and the power sink component. The second grounding copper surface portion is electrically connected to the second power supply component and the power sink component. The first power supply component, the second power supply component, the power sink component, the first power copper surface portion, the second power copper surface portion, the third power copper surface portion, the convergence copper surface portion, the first grounding copper surface portion and the second grounding copper surface portion conform to a current balancing design of the printed circuit board. When a first sum of the equivalent resistances of the first power copper surface portion and the first grounding copper surface portion and a second sum of the equivalent resistances of the second power copper surface portion and the second grounding copper surface portion satisfy the following inequality, the first power supply component, the second power supply component, the power sink component, the first power copper surface portion, the second power copper surface portion, the third power copper surface portion, the convergence copper surface portion, the first grounding copper surface portion and the second grounding copper surface portion conform to the current balancing design:

$$\frac{\text{Average current} - \text{first tolerable difference value}}{\text{Average current} + \text{first tolerable difference value}} \leq$$

$$\frac{\text{First sum}}{\text{Second sum}} \leq \frac{\text{Average current} + \text{first tolerable difference value}}{\text{Average current} - \text{first tolerable difference value}}$$

$$\text{or } \frac{\text{Average current} - \text{second tolerable difference value}}{\text{Average current} + \text{second tolerable difference value}} \leq$$

$$\frac{\text{Second sum}}{\text{First sum}} \leq \frac{\text{Average current} + \text{second tolerable difference value}}{\text{Average current} - \text{second tolerable difference value}}$$

where the first tolerable difference value corresponds to the current of the first power supply component, and the second tolerable difference value corresponds to the current of the second power supply component. Or, When an absolute value of a difference value between the current of the first power supply component and the average current is less than or equal to the first tolerable difference value, and an absolute value of a difference value between the current of the second power supply component and the average current is less than or equal to the second tolerable difference value, the first power supply component, the second power supply component, the power sink component, the first power copper surface portion, the second power copper surface portion, the third power copper surface portion, the convergence copper surface portion, the first grounding copper surface portion and the second grounding copper surface portion conform to the current balancing design.

According to a power copper surface configuration method of a printed circuit board of the present invention, the printed circuit board includes a first power copper surface portion electrically connected to a first power supply component, a second power copper surface portion electrically connected to a second power supply component, a third power copper surface portion electrically connected to a power sink component, a convergence copper surface portion electrically connected to the first power copper surface portion, the second power copper surface portion and the third power copper surface portion, a first grounding copper surface portion electrically connected to the first power supply component and the power sink component, and a second grounding copper surface portion electrically connected to the second power supply component and the power sink component. The power copper surface configuration method includes the following steps: configuring the first power supply component, the second power supply component, the power sink component, the first power copper surface portion, the second power copper surface portion, the third power copper surface portion, the convergence copper surface portion, the first grounding copper surface portion and the second grounding copper surface portion; determining whether a current of the first power supply component flows to the power sink component from the convergence copper surface portion, the convergence copper surface portion being electrically connected to the first power copper surface portion, the second power copper surface portion and the third power copper surface portion; determining whether a current of the second power supply component flows to the power sink component from the convergence copper surface portion; when the currents of the first power supply component and the second power supply component both flow to the power sink component from the convergence copper surface portion, determining whether the first power supply component, the second power supply component, the power sink component, the first power copper surface portion, the second power copper surface portion, the third power copper surface portion, the convergence copper surface portion, the first grounding copper surface portion and the second grounding copper surface portion conform to a current balancing design of the printed circuit board according to at least one of a first tolerable difference value and a second tolerable difference value and an average current, wherein the first tolerable difference value corresponds to the current of the first power supply component, and the second tolerable difference value corresponds to the current of the second power supply component; and when the first power supply component, the second power supply component, the power sink component, the first power copper surface portion, the second power copper surface portion, the third power copper surface portion, the convergence copper surface portion, the first grounding copper surface portion and the second grounding copper surface portion conform to the current balancing design of the printed circuit board, ending the power copper surface configuration method.

The printed circuit board and the power copper surface configuration method thereof according to the embodiments of the present invention can determine whether the first power supply component, the second power supply component, the power sink component, the first power copper surface portion, the second power copper surface portion, the third power copper surface portion, the convergence copper surface portion, the first grounding copper surface portion and the second grounding copper surface portion conform to the current balancing design of the printed circuit board according to at least one of the first tolerable difference value and the second tolerable difference value and the average current. Therefore, the non-uniform condition of the output currents of the first power supply component and the second power supply component can be avoided or suppressed.

In order to make the aforementioned and other objectives and advantages of the present invention comprehensible, embodiments accompanied with figures are described in detail below.

DESCRIPTION OF THE EMBODIMENTS

Figure 1A:
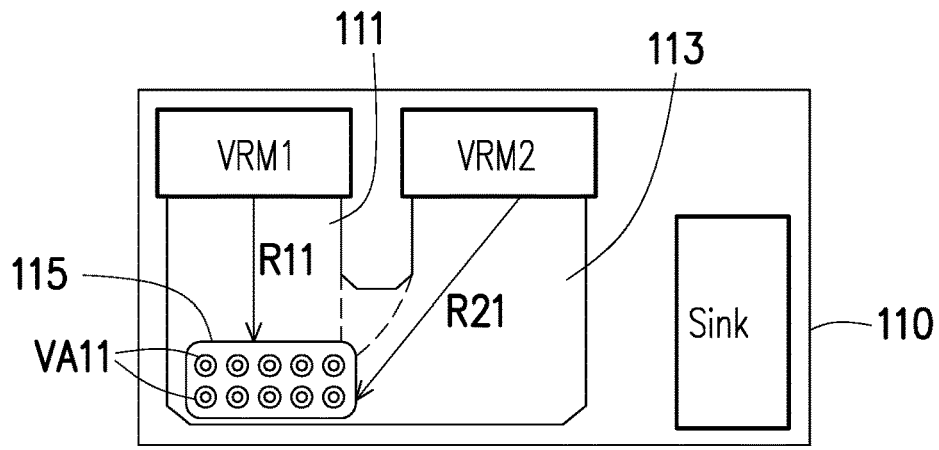
FIGS. 1A to 1C are schematic diagrams of a layout of all layers of a printed circuit board according to Embodiment 1 of the present invention.
Figure 1B:
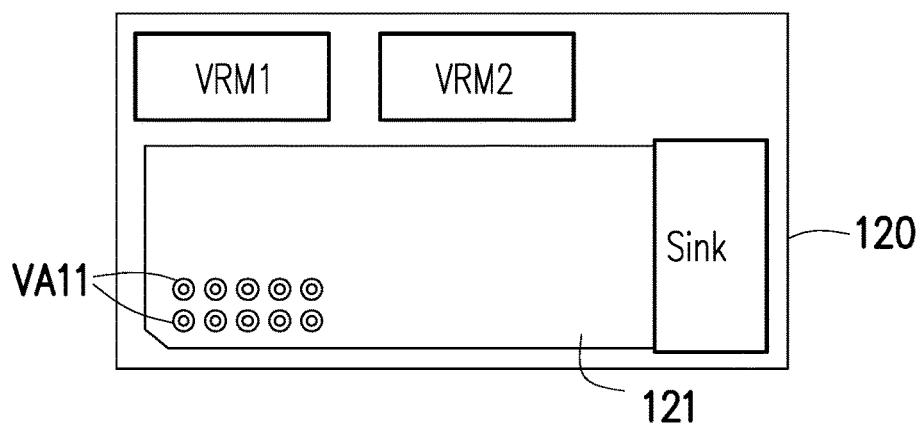
Figure 1C:
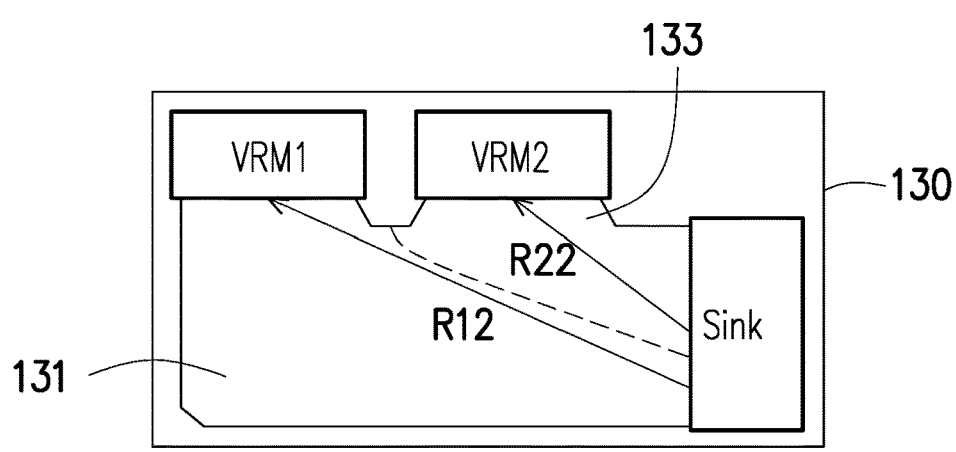

FIGS. 1A to 1C are schematic layout diagrams of all layers of a printed circuit board according to Embodiment 1 of the present invention. Referring to FIGS. 1A to 1C, in the present embodiment, only three layers of printed circuit boards are illustrated, namely a first layer of printed circuit board 110, a second layer of printed circuit board 120 and a third layer of printed circuit board 130, but in other embodiments, the printed circuit board may have more layers of printed circuit boards.

In the printed circuit board, at least a first power supply component VRM1, a second power supply component VRM2 and a power sink component Sink are configured. The first power supply component VRM1 and the second power supply component VRM2 are configured to provide currents. Here, the first power supply component VRM1, the second power supply component VRM2 and the power sink component Sink are mounted by Dual In Line Package (DIP). That is, parts (e.g. pins) of the first power supply component VRM1, the second power supply component VRM2 and the power sink component Sink penetrate the first layer of printed circuit board 110, the second layer of printed circuit board 120 and the third layer of printed circuit board 130. In other embodiments, the first power supply component VRM1, the second power supply component VRM2 and the power sink component Sink may be mounted by Surface Mount Technology (SMT). That is, the first power supply component VRM1, the second power supply component VRM2 and the power sink component Sink may be arranged on the topmost layer (such as the first layer of printed circuit board 110) and the bottommost layer (such as the third layer of printed circuit board 130) of the printed circuit board, and the first power supply component VRM1 and the second power supply component VRM2 may be arranged on different layers of printed circuit boards.

Referring to FIG. 1A, a copper surface electrically connected to the first power supply component VRM1 and the second power supply component VRM2 is provided on the first layer of printed circuit board 110, but this copper surface and the power sink component Sink may be regarded as being electrically insulated on the first layer of printed circuit board 110. In the present embodiment, the copper surface of the first layer of printed circuit board 110 may be roughly divided into a first power copper surface portion 111, a second power copper surface portion 113 and a convergence copper surface portion 115. The first power copper surface portion 111 is electrically connected to the first power supply component VRM1 and the convergence copper surface portion 115, so as to be used as a path for the current flowing from the first power supply component VRM1 to the convergence copper surface portion 115, which has an equivalent resistance of R11.

The second power copper surface portion 113 is electrically connected to the second power supply component VRM2 and the convergence copper surface portion 115, so as to be used as a path for the current flowing from the second power supply component VRM2 to the convergence copper surface portion 115, which has an equivalent resistance of R21. Referring to FIG. 1B, a copper surface (including a third power copper surface portion 121) electrically connected to the power sink component Sink is provided on the second layer of printed circuit board 120. The third power copper surface portion 121 is electrically connected to the convergence copper surface portion 115 through a plurality of via holes VAll11 going through from the first layer of printed circuit board 110 to the second layer of printed circuit board 120, so as to be used as a path of the current flowing from the convergence copper surface portion 115 to the power sink component Sink.

Referring to FIG. 1C, a copper surface electrically connected to the first power supply component VRM1, the second power supply component VRM2 and the power sink component Sink is provided on the third layer of printed circuit board 130, and is roughly divided into a first grounding copper surface portion 131 and a second grounding copper surface portion 133. The first grounding copper surface portion 131 is electrically connected to the first power supply component VRM1 and the power sink component Sink, so as to be used as a path for the current flowing from the power sink component Sink to the first power supply component VRM1, which has an equivalent resistance of R12. The second grounding copper surface portion 133 is electrically connected to the second power supply component VRM2 and the power sink component Sink, so as to be used as a path for the current flowing from the power sink component Sink to the second power supply component VRM2, which has an equivalent resistance of R22.

The first power copper surface portion 111, the second power copper surface portion 113, the convergence copper surface portion 115 and the third power copper surface portion 121 are configured to provide (or transmit) a high voltage (e.g., a power voltage) to the power sink component Sink, and the first grounding copper surface portion 131 and the second grounding copper surface portion 133 are configured to provide (or transmit) a low voltage (e.g., a grounding voltage) to the power sink component Sink.

In the present embodiment, the printed circuit board as shown in FIGS. 1A to 1C is firstly simulated by a layout program, and a current balancing operation is performed, so as to balance output loads of the first power supply component VRM1 and the second power supply component VRM2. In other words, in the layout program, positions of the first power supply component VRM1, the second power supply component VRM2, the power sink component Sink, the first power copper surface portion 111, the second power copper surface portion 113, the third power copper surface portion 121, the convergence copper surface portion 115, the first grounding copper surface portion 131 and the second grounding copper surface portion 133 are determined at first. The layout program determines whether the positions of the first power supply component VRM1, the second power supply component VRM2, the power sink component Sink, the first power supply copper surface portion 111, the second power supply copper surface portion 113, the third power supply copper surface portion 121, the convergence copper surface portion 115, the first grounding copper surface portion 131 and the second grounding copper surface portion 133 conform to the current balancing design of the printed circuit board, so as to determine whether to reconfigure the positions of the first power supply component VRM1, the second power supply component VRM2, the power sink component Sink, the first power supply copper surface portion 111, the second power supply copper surface portion 113, the third power supply copper surface portion 121, the convergence copper surface portion 115, the first grounding copper surface portion 131 and the second grounding copper surface portion 133.

In the present embodiment of the present invention, the respective currents of the first power supply component VRM1 and the second power supply component VRM2 flow to the current position of the convergence copper surface portion 115 via the first power copper surface portion 111 and the second power copper surface portion 113, and then flow to the power sink component Sink via the current position of the convergence copper surface portion 115. Then, the layout program may calculate the current of the power sink component Sink, and set a first tolerable difference value corresponding to the current of the first power supply component VRM1 and a second tolerable difference value corresponding to the current of the second power supply component VRM2. The current of the power sink component Sink is a sum of the current of the first power supply component VRM1 and the current of the second power supply component VRM2.

The first tolerable difference value is an absolute value of a tolerable maximum difference between the current of the first power supply component VRM1 and an average current, and the second tolerable difference value is an absolute value of a tolerable maximum difference between the current of the second power supply component VRM2 and the average current. The average current is a half of the current of the power sink component Sink. In this case, the layout program can determine whether the positions of the first power supply component VRM1, the second power supply component VRM2, the power sink component Sink, the first power copper surface portion 111, the second power copper surface portion 113, the third power copper surface portion 121, the convergence copper surface portion 115, the first grounding copper surface portion 131 and the second grounding copper surface portion 133 conform to the current balancing design of the printed circuit board according to the first tolerable difference value and the second tolerable difference value.

For example, assume that the current of the power sink component Sink is 45 A, the average current is 22.5 A, and the first tolerable difference value and the second tolerable difference value are 2 A. In this case, when the currents of the first power supply component VRM1 and the second power supply component VRM2 are both more than or equal to 20.5 A and less than or equal to 24.5 A, the current positions of the first power supply component VRM1, the second power supply component VRM2, the power sink component Sink, the first power copper surface portion 111, the second power copper surface portion 113, the third power copper surface portion 121, the convergence copper surface portion 115, the first grounding copper surface portion 131 and the second grounding copper surface portion 133 conform to the current balancing design of the printed circuit board; and when the current of at least one of the first power supply component VRM1 and the second power supply component VRM2 is less than 20.5 A or more than 24.5 A, the current positions of the first power supply component VRM1, the second power supply component VRM2, the power sink component Sink, the first power copper surface portion 111, the second power copper surface portion 113, the third power copper surface portion 121, the convergence copper surface portion 115, the first grounding copper surface portion 131 and the second grounding copper surface portion 133 do not conform to the current balancing design of the printed circuit board. Next, the layout program may reconfigure the positions of the first power supply component VRM1, the second power supply component VRM2, the power sink component Sink, the first power copper surface portion 111, the second power copper surface portion 113, the third power copper surface portion 121, the convergence copper surface portion 115, the first grounding copper surface portion 131 and the second grounding copper surface portion 133, and/or increase the first tolerable difference value and the second tolerable difference value (for example, the difference value is increased to 3 A).

Or, the layout program may further calculate a first sum (namely R11+R12) of the equivalent resistances of the first power copper surface portion 111 and the first grounding copper surface portion 131 and a second sum (namely R21+R22) of the equivalent resistances of the second power copper surface portion 113 and the second grounding copper surface portion 133. Then, the layout program can determine whether the positions of the first power supply component VRM1, the second power supply component VRM2, the power sink component Sink, the first power copper surface portion 111, the second power copper surface portion 113, the third power copper surface portion 121, the convergence copper surface portion 115, the first grounding copper surface portion 131 and the second grounding copper surface portion 133 conform to the current balancing design of the printed circuit board according to the first sum, the second sum and one of the first tolerable difference value and the second tolerable difference value. In other words, whether the positions of the first power supply component VRM1, the second power supply component VRM2, the power sink component Sink, the first power copper surface portion 111, the second power copper surface portion 113, the third power copper surface portion 121, the convergence copper surface portion 115, the first grounding copper surface portion 131 and the second grounding copper surface portion 133 conform to the current balancing design of the printed circuit board is determined by whether a ratio of the first sum to the second sum falls in a resistance ratio interval for the current balancing. The resistance ratio interval of the current balancing may satisfy the following inequality:

$$\frac{\text{Average current} - \text{first tolerable difference value}}{\text{Average current} + \text{first tolerable difference value}} \leq$$

$$\frac{\text{First sum}}{\text{Second sum}} \leq \frac{\text{Average current} + \text{first tolerable difference value}}{\text{Average current} - \text{first tolerable difference value}}$$

$$\text{or } \frac{\text{Average current} - \text{second tolerable difference value}}{\text{Average current} + \text{second tolerable difference value}} \leq$$

$$\frac{\text{Second sum}}{\text{First sum}} \leq \frac{\text{Average current} + \text{second tolerable difference value}}{\text{Average current} - \text{second tolerable difference value}}$$

For example, given that the current of the power sink component Sink is 45 A, the average current is 22.5 A, and the first tolerable difference value and the second tolerable difference value are 2 A. In this case, if $$\frac{22.5 - 2}{22.5 + 2} \leq \frac{\text{First sum}}{\text{Second sum}} \leq$$

$$\frac{22.5 + 2}{22.5 - 2} \text{ or } \frac{22.5 - 2}{22.5 + 2} \leq \frac{\text{Second sum}}{\text{First sum}} \leq \frac{22.5 + 2}{22.5 - 2}$$

$$\left(\text{i.e., } 0.837 \leq \frac{\text{First sum}}{\text{Second sum}} \leq 1.195 \text{ or } 0.837 \leq \frac{\text{Second sum}}{\text{First sum}} \leq 1.195\right),$$

the current positions of the first power supply component VRM1, the second power supply component VRM2, the power sink component Sink, the first power supply copper surface portion 111, the second power supply copper surface portion 113, the third power supply copper surface portion 121, the convergence copper surface portion 115, the first grounding copper surface portion 131 and the second grounding copper surface portion 133 conform to the current balancing design of the printed circuit board; otherwise, the current positions of the first power supply component VRM1, the second power supply component VRM2, the power sink component Sink, the first power supply copper surface portion 111, the second power supply copper surface portion 113, the third power supply copper surface portion 121, the convergence copper surface portion 115, the first grounding copper surface portion 131 and the second grounding copper surface portion 133 do not conform to the current balancing design of the printed circuit board. Next, the layout program may reconfigure the positions of the first power supply component VRM1, the second power supply component VRM2, the power sink component Sink, the first power copper surface portion 111, the second power copper surface portion 113, the third power copper surface portion 121, the convergence copper surface portion 115, the first grounding copper surface portion 131 and the second grounding copper surface portion 133, and/or increase the first tolerable difference value and the second tolerable difference value (for example, the difference value is increased to 3 A).

In the present embodiment, the first power copper surface portion 111 and the second power copper surface portion 113 are arranged in the first layer of printed circuit board 110, but in other embodiments, the first power copper surface portion 111 and the second power copper surface portion 113 may be arranged in different layers of printed circuit boards, and are, for example, separately arranged in the first layer of printed circuit board 110 and the second layer of printed circuit board 120, and the embodiment of the present invention is not limited thereto. It should be noted that the mounting approach (such as DIP or the SMT) of the first power supply component VRM1, the second power supply component VRM2 and the power sink component Sink, and the configuration of the first power copper surface portion 111 and the second power copper surface portion 113 may come in different permutations and combinations according to requirements on the same layer or different layers, as long as the first power supply component VRM1, the second power supply component VRM2, the power sink component Sink, the first power copper surface portion 111, the second power copper surface portion 113, the third power copper surface portion 121, the convergence copper surface portion 115, the first grounding copper surface portion 131 and the second grounding copper surface portion 133 conform to the current balancing design of the printed circuit board, which all fall within the scope of the present invention.

Figure 2A:
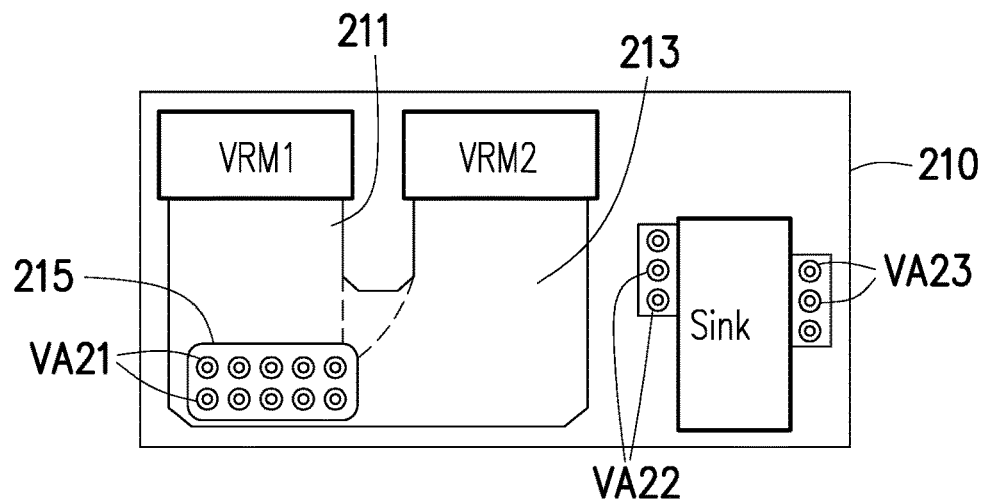
FIGS. 2A to 2C are schematic diagrams of layouts of all layers of a printed circuit board according to Embodiment 2 of the present invention.
Figure 2B:
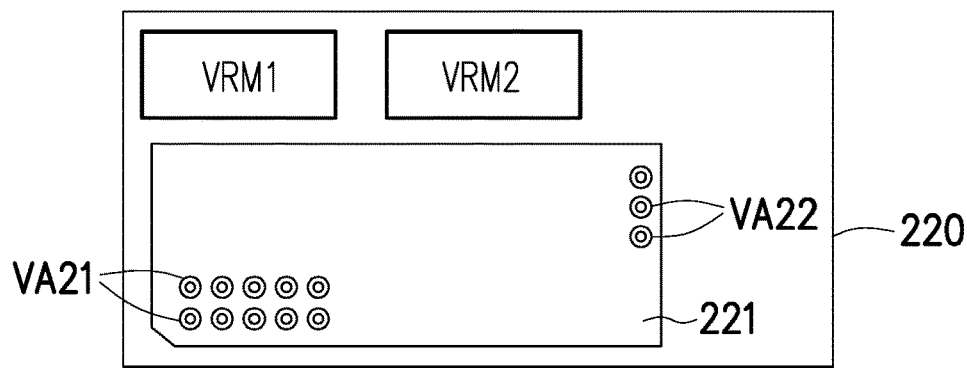
Figure 2C:
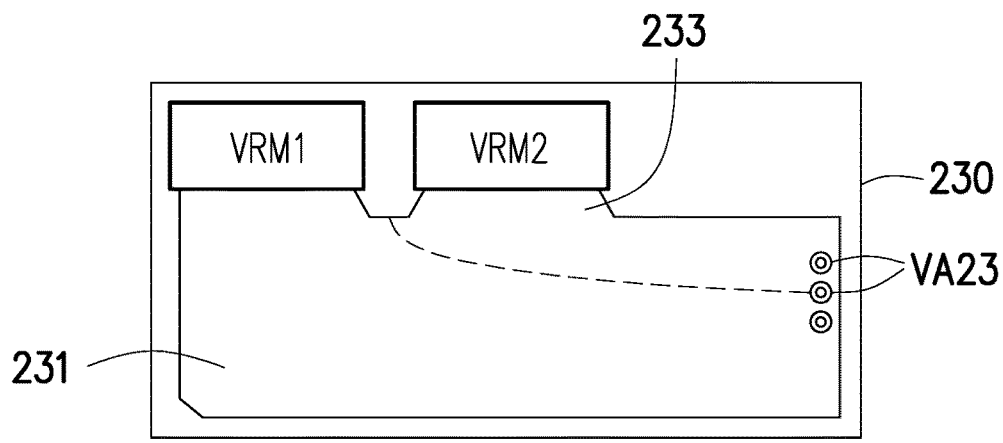

FIGS. 2A to 2C are schematic diagrams of layouts of all layers of a printed circuit board according to Embodiment 2 of the present invention. Referring to FIGS. 1A to 1C and FIGS. 2A to 2C, the printed circuit board as shown in FIGS. 2A to 2C is similar to the printed circuit board as shown in FIGS. 1A to 1C, and the same or similar components use the same or similar numerals. In the present embodiment, a first layer of printed circuit board 210, a second layer of printed circuit board 220 and a third layer of printed circuit board 230 are illustrated. Furthermore, the first power supply component VRM1 and the second power supply component VRM2 are mounted by DIP, but the power sink component Sink is mounted by SMT. That is, the first power supply component VRM1 and the second power supply component VRM2 go through the first layer of printed circuit board 210, the second layer of printed circuit board 220 and the third layer of printed circuit board 230, but the power sink component Sink is only disposed on the topmost layer (such as the first layer of printed circuit board 210) in the printed circuit board.

A copper surface electrically connected to the first power supply component VRM1 and the second power supply component VRM2 is provided in the first layer of printed circuit board 210, but this copper surface and the power sink component Sink may be regarded as being electrically insulated in the first layer of printed circuit board 210. In the present embodiment, the copper surface of the first layer of printed circuit board 210 may be roughly divided into a first power copper surface portion 211, a second power copper surface portion 213 and a convergence copper surface portion 215. The first power copper surface portion 211 is electrically connected to the first power supply component VRM1 and the convergence copper surface portion 215, so as to be used as a path for the current flowing from the first power supply component VRM1 to the convergence copper surface portion 215.

The second power copper surface portion 213 is electrically connected to the second power supply component VRM2 and the convergence copper surface portion 215, so as to be used as a path for the current flowing from the second power supply component VRM2 to the convergence copper surface portion 215. A third power copper surface portion 221 is provided on the second layer of printed circuit board 220. The third power copper surface portion 221 is electrically connected to the convergence copper surface portion 115 through a plurality of via holes VA21 (corresponding to second via holes) going through from the first layer of printed circuit board 210 to the second layer of printed circuit board 220, and the third power copper surface portion 221 is electrically connected to the power sink component Sink through a plurality of via holes VA22 (corresponding to first via holes) going through from the first layer of printed circuit board 210 to the second layer of printed circuit board 220, so as to be used as a path for the current flowing from the convergence copper surface portion 115 to the power sink component Sink.

A copper surface electrically connected to the first power supply component VRM1 and the second power supply component VRM2 is provided on the third layer of printed circuit board 230, and is roughly divided into a first grounding copper surface portion 231 and a second grounding copper surface portion 233. The first grounding copper surface portion 231 is electrically connected to the first power supply component VRM1, and the first grounding copper surface portion 231 is electrically connected to the power sink component Sink through a plurality of via holes VA23 (corresponding to third via holes) going through from the first layer of printed circuit board 210 to the third layer of printed circuit board 230, so as to be used as a path for the current flowing from the power sink component Sink to the first power supply component VRM1. The second grounding copper surface portion 233 is electrically connected to the second power supply component VRM2, and the second grounding copper surface portion 233 is also electrically connected to the power sink component Sink via the plurality of via holes VA23 going through from the first layer of printed circuit board 210 to the third layer of printed circuit board 230, so as to be used as a path for the current flowing from the power sink component Sink to the second power supply component VRM2.

The first power copper surface portion 211, the second power copper surface portion 213, the convergence copper surface portion 215 and the third power copper surface portion 221 are configured to provide (or transmit) a high voltage (e.g., a power voltage) to the power sink component Sink, and the first grounding copper surface portion 231 and the second grounding copper surface portion 233 are configured to provide (or transmit) a low voltage (e.g., a grounding voltage) to the power sink component Sink.

Figure 3:
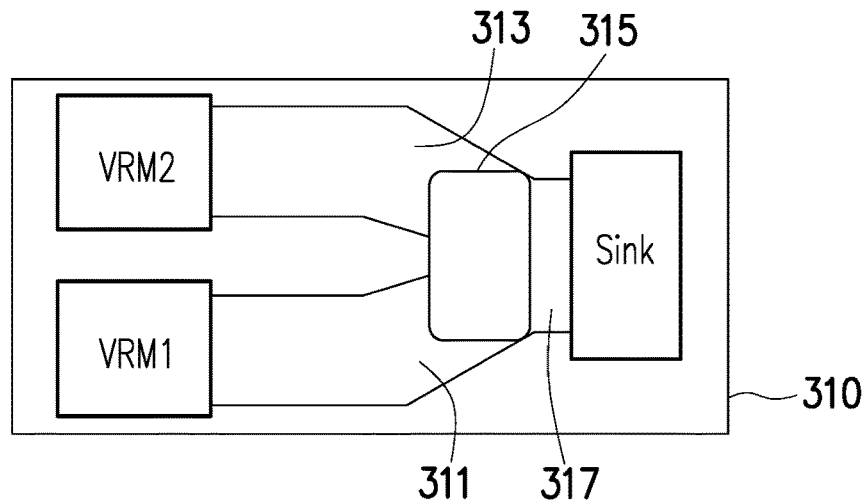
FIG. 3 is a schematic diagram of a layout of a first layer of printed circuit board of a printed circuit board according to Embodiment 3 of the present invention.

FIG. 3 is a schematic diagram of a layout of a first layer of printed circuit board according to Embodiment 3 of the present invention. Referring to FIG. 3, in the present embodiment, only a first layer of printed circuit board 310 is illustrated, and other layers in the printed circuit board may reference the third layer of printed circuit board 130 as shown in FIG. 1 or the third layer of printed circuit board 230 as shown in FIG. 2, and may reference the structures of other layers in the printed circuit board as shown in FIG. 1 or 2, and descriptions thereof are omitted herein. A first power supply component VRM1, a second power supply component VRM2 and a power sink component Sink may be mounted by DIP or SMT, which can be determined according to a circuit design.

A copper surface electrically connected with the first power supply component VRM1, the second power supply component VRM2 and the power sink component Sink is provided on the first layer of printed circuit board 310. In the present embodiment, the copper surface of the first layer of printed circuit board 310 may be roughly divided into a first power copper surface portion 311, a second power copper surface portion 313, a convergence copper surface portion 315 and a third power copper surface portion 317.

The first power copper surface portion 311 is electrically connected to the first power supply component VRM1 and the convergence copper surface portion 315, so as to be used as a path for the current flowing from the first power supply component VRM1 to the convergence copper surface portion 315. The second power copper surface portion 313 is electrically connected to the second power supply component VRM2 and the convergence copper surface portion 315, so as to be used as a path for the current flowing from the second power supply component VRM2 to the convergence copper surface portion 315. The third power copper surface portion 317 is electrically connected to the power sink component Sink and the convergence copper surface portion 315, so as to be used as a path for the current flowing from the convergence copper surface portion 315 to the power sink component Sink. The first power copper surface portion 311, the second power copper surface portion 313, the convergence copper surface portion 315 and the third power copper surface portion 317 are configured to provide (or transmit) a high voltage (such as a power voltage) to the power sink component Sink.

In other embodiments, the first layer of printed circuit board 310 may be provided with at least one of a first grounding copper surface portion (such as 131 or 231) and a second grounding copper surface portion (such as 133 or 233), but the embodiment of the present invention is not limited thereto.

Figure 4A:
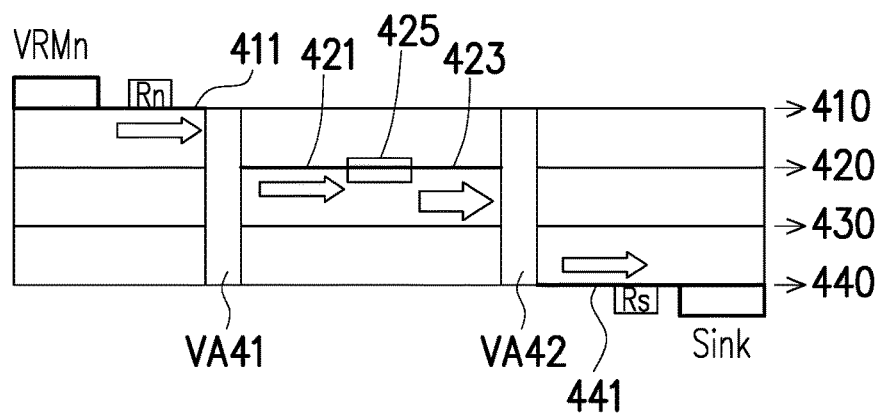
FIGS. 4A to 4B are cross-sectional views of a printed circuit board according to Embodiment 4 of the present invention.
Figure 4B:
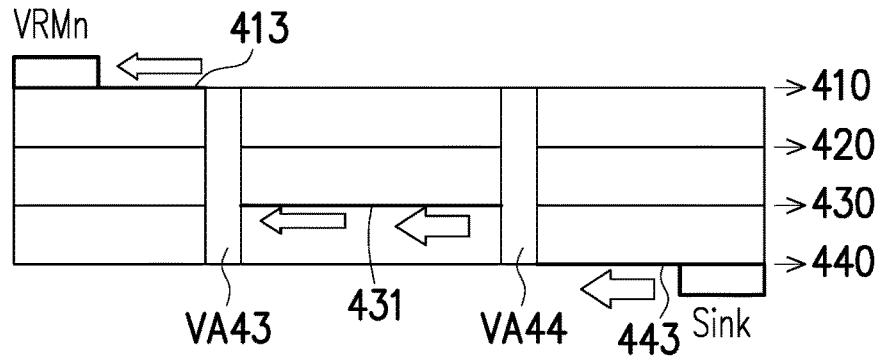

FIGS. 4A to 4B are cross-sectional views of a printed circuit board according to Embodiment 4 of the present invention. Referring to FIGS. 4A and 4B, in the present embodiment, four layers of printed circuit boards are illustrated, namely a first layer of printed circuit board 410, a second layer of printed circuit board 420, a fourth layer of printed circuit board 430 and a third layer of printed circuit board 440, where "first", "second", "third" and "fourth" are used to distinguish different layers of printed circuit boards, but are not representative of the order of the printed circuit boards. Furthermore, a power supply component VRMn and a power sink component Sink which are mounted by SMT are taken for example.

Referring to FIG. 4A, in the present embodiment, each of a first power copper surface portion and a second power copper surface portion includes a copper surface 411 arranged on the first layer of printed circuit board 410, a copper surface 421 arranged on the second layer of printed circuit board 420 and a via hole VA41 (only one via hole is illustrated herein, but there may be a plurality of via holes actually) electrically connected to the copper surfaces 411 and 421. That is, the copper surfaces 411 and 421 are electrically connected with each other. The copper surface 411 may be electrically connected to the power supply component VRMn (which may be a first power supply component VRM1 or a second power supply component VRM2) through a connection component (such as a resistor Rn), and the copper surface 421 is electrically connected to a convergence copper surface portion 425. In this case, the equivalent resistance from the power supply component VRMn to the convergence copper surface portion 425 should take the resistance value of the connection component (such as the resistor Rn) into consideration.

A third power copper surface portion includes a copper surface 423 arranged on the second layer of printed circuit board 420, a copper surface 441 arranged on the third layer of printed circuit board 440 and a via hole VA42 (only one via hole is illustrated herein, but there may be a plurality of via holes actually) electrically connected to the copper surfaces 423 and 441. That is, the copper surfaces 423 and 441 are electrically connected with each other. The copper surface 423 is electrically connected to the convergence copper surface portion 425, and the copper surface 441 may be electrically connected to the power sink component Sink through a connection component (such as a resistor Rs). In this case, the equivalent resistance from the convergence copper surface portion 425 to the power sink component Sink should take the resistance value of the tandem connection component (such as the resistor Rs) into consideration.

Each of the first power copper surface portion and the second power copper surface portion includes a copper surface 413 arranged on the first layer of printed circuit board 410, a copper surface 431 arranged on the fourth layer of printed circuit board 430, a copper surface 443 arranged on the third layer of printed circuit board 440 and via holes VA43 and VA44 electrically connected to the copper surfaces 413, 431 and 443. That is, the copper surfaces 413, 431 and 443 are electrically connected with one another. The copper surface 413 is electrically connected to the power supply component VRMn (which may be the first power supply component or the second power supply component), and the copper surface 443 is electrically connected to the power sink component Sink.

Figure 4C:
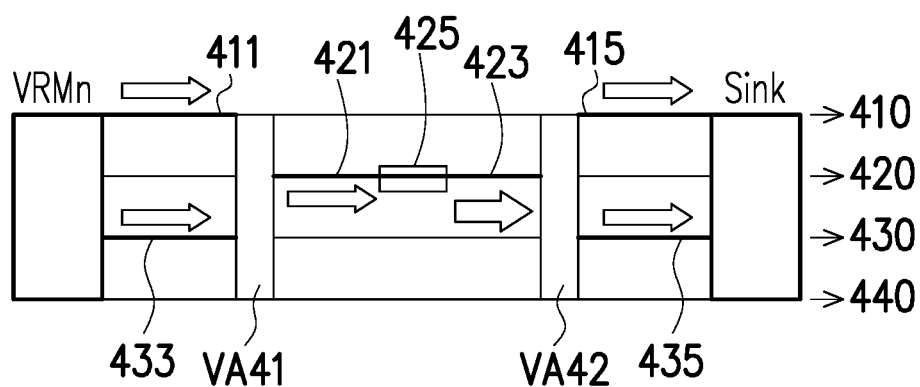
FIGS. 4C to 4D are cross-sectional views of a printed circuit board according to Embodiment 5 of the present invention.
Figure 4D:
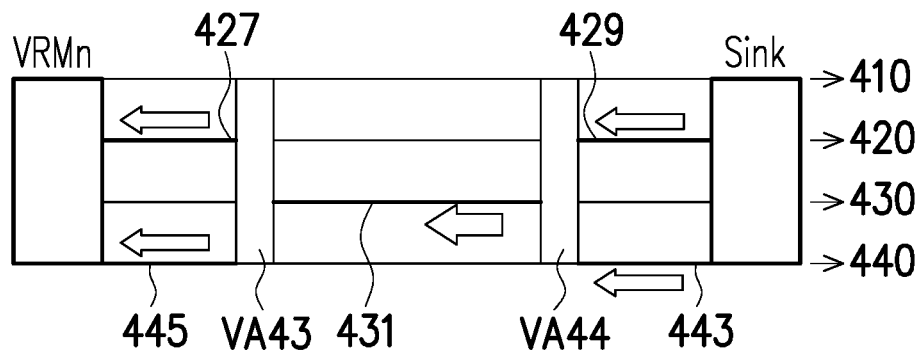

FIGS. 4C to 4D are cross-sectional views of a printed circuit board according to Embodiment 5 of the present invention. Referring to FIGS. 4A to 4D, the same or similar components use the same or similar numerals. Referring to FIG. 4C, in the present embodiment, the power supply component VRMn and the power sink component Sink which are mounted by DIP are taken for example.

Each of the first power copper surface portion and the second power copper surface portion includes a copper surface 411 arranged on the first layer of printed circuit board 410, a copper surface 421 arranged on the second layer of printed circuit board 420, a copper surface 433 arranged on the fourth layer of printed circuit board 430 and a via hole VA41 (only one via hole is illustrated herein, but there may be a plurality of via holes actually) electrically connected to the copper surfaces 411, 421 and 433. That is, the copper surfaces 411, 421 and 433 are electrically connected with one another. The copper surfaces 411 and 433 are electrically connected to the power supply component VRMn (which may be the first power supply component or the second power supply component), and the copper surface 421 is electrically connected to the convergence copper surface portion 425.

The third power copper surface portion includes a copper surface 415 arranged on the first layer of printed circuit board 410, a copper surface 423 arranged on the second layer of printed circuit board 420, a copper surface 435 arranged on the fourth layer of printed circuit board 430 and a via hole VA42 (only one via hole is illustrated herein, but there may be a plurality of via holes actually) electrically connected to the copper surfaces 415, 423 and 435. That is, the copper surfaces 415, 423 and 435 are electrically connected with one another. The copper surface 423 is electrically connected to the convergence copper surface portion 425, and the copper surfaces 415 and 435 are electrically connected to the power sink component Sink.

Each of the first power copper surface portion and the second power copper surface portion includes copper surfaces 427 and 429 arranged on the second layer of printed circuit board 420, a copper surface 431 arranged on the fourth layer of printed circuit board 430, copper surfaces 443 and 445 arranged on the third layer of printed circuit board 440 and via holes VA43 and VA44 electrically connected to the copper surfaces 427, 429, 431, 443 and 445. That is, the copper surfaces 427, 429, 431, 443 and 445 are electrically connected with one another. The copper surfaces 427 and 445 are electrically connected to the power supply component VRMn (which may be the first power supply component or the second power supply component), and the copper surfaces 429 and 443 are electrically connected to the power sink component Sink.

Figure 5A:
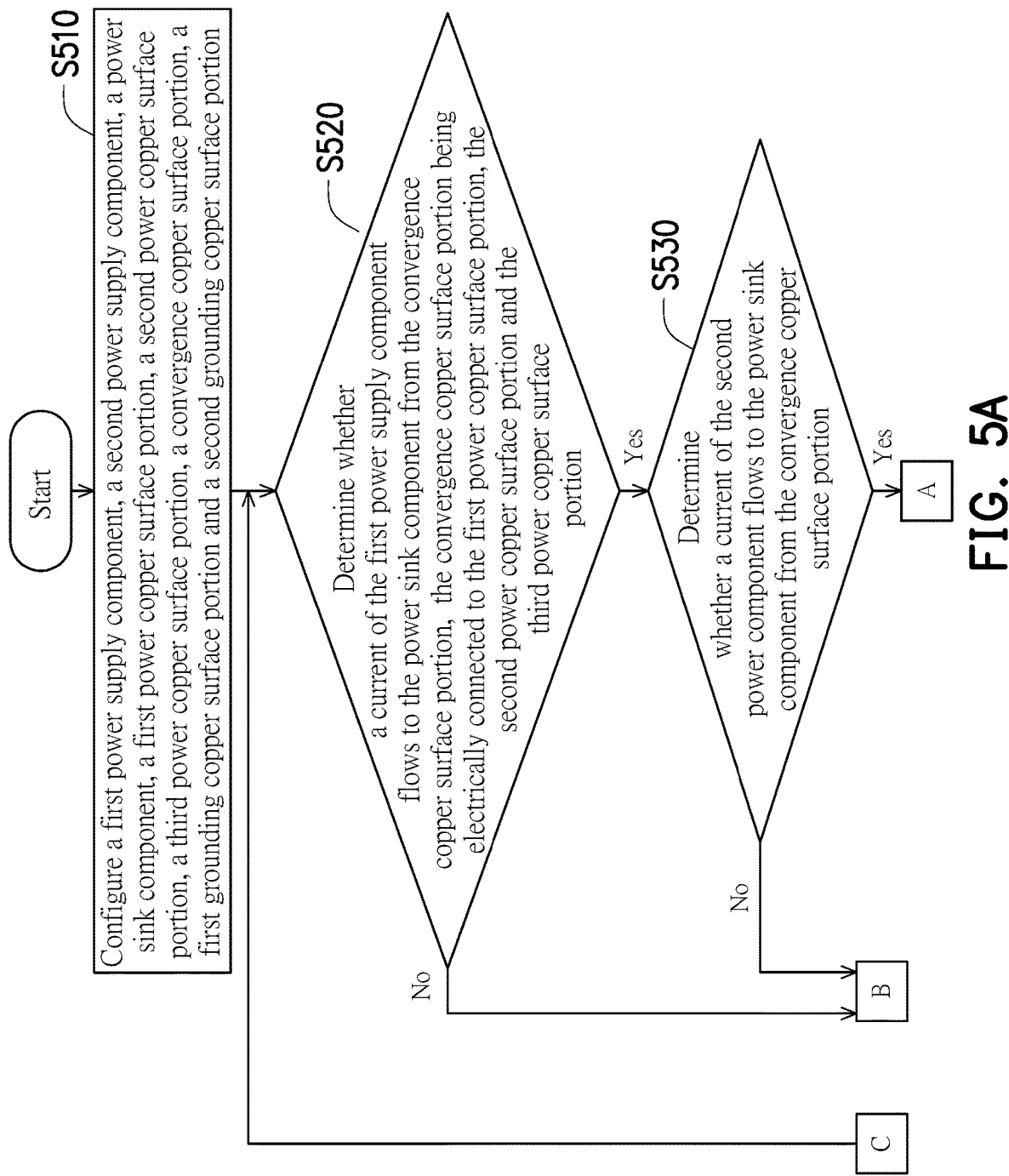
FIGS. 5A and 5B are a flowchart of a power copper surface configuration method of a printed circuit board according to one embodiment of the present invention.
Figure 5B:
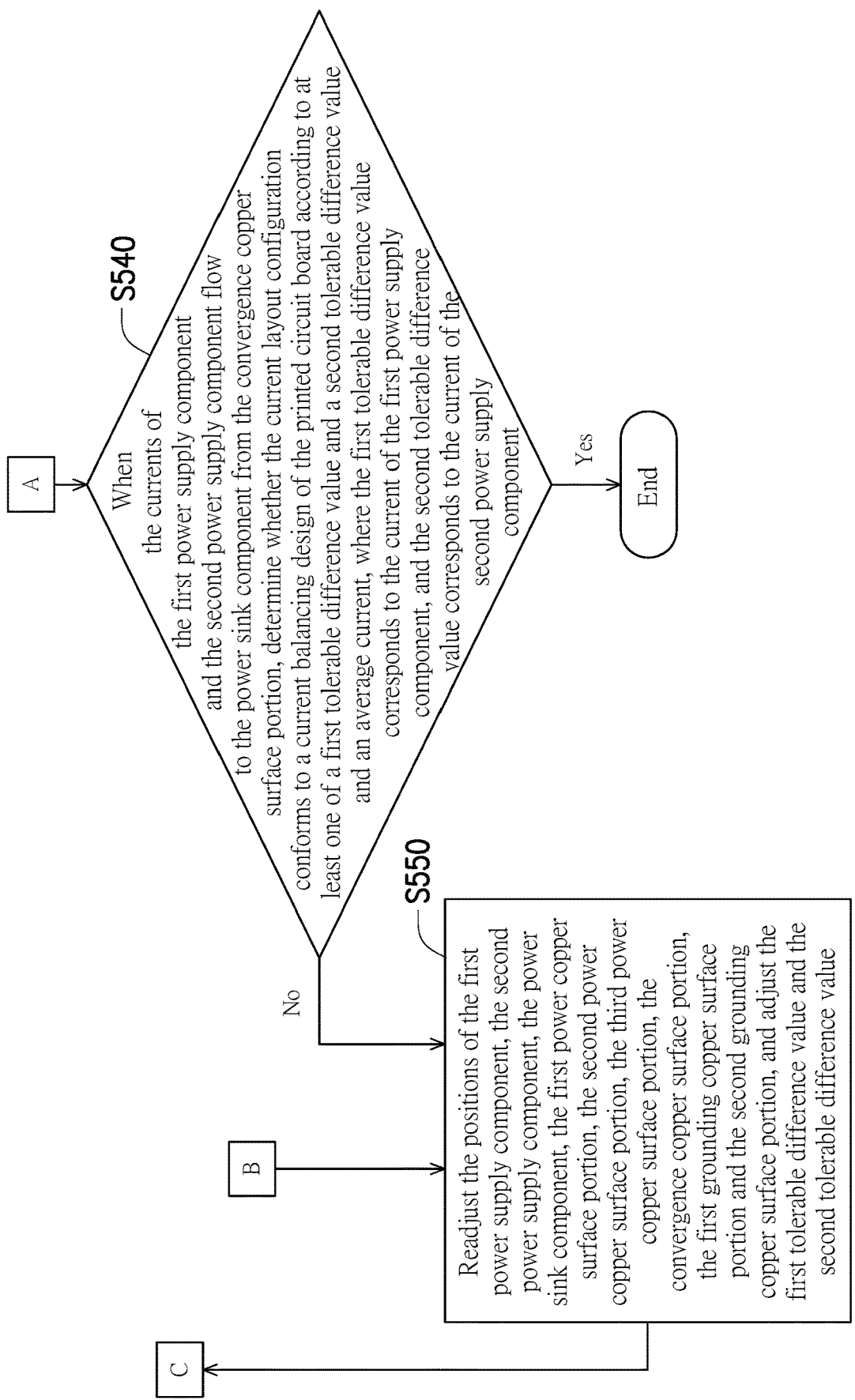

FIGS. 5A and 5B are a flowchart of a power copper surface configuration method of a printed circuit board according to one embodiment of the present invention. Referring to FIGS. 5A and 5B, in the present embodiment, the printed circuit board includes a first power copper surface portion electrically connected to a first power supply component, a second power copper surface portion electrically connected to a second power supply component, a third power copper surface portion electrically connected to a power sink component, a first grounding copper surface portion electrically connected to the first power supply component and the power sink component, and a second grounding copper surface portion electrically connected to the second power supply component and the power sink component.

The power copper surface configuration method includes the following steps. In Step S510, the first power supply component, the second power supply component, the power sink component, the first power copper surface portion, the second power copper surface portion, the third power copper surface portion, a convergence copper surface portion, the first grounding copper surface portion and the second grounding copper surface portion are configured at first. In Step S520, whether a current of the first power supply component flows to the power sink component from the current position of the convergence copper surface portion is determined. T convergence copper surface portion is electrically connected to the first power copper surface portion, the second power copper surface portion and the third power copper surface portion. When a determination result of the step S520 is "NO", Step S550 is continued; and when the determination result of the step S520 is "YES", Step S530 is continued.

In Step S530, whether a current of the second power supply component flows to the power sink component from the current position of the convergence copper surface portion is determined. When a determination result of the step S530 is "NO", Step S550 is continued; and when the determination result of the step S530 is "YES", Step S540 is continued. In Step S540, when the currents of the first power supply component and the second power supply component both flow to the power sink component from the current position of the convergence copper surface portion, whether the first power supply component, the second power supply component, the power sink component, the first power copper surface portion, the second power copper surface portion, the third power copper surface portion, the convergence copper surface portion, the first grounding copper surface portion and the second grounding copper surface portion (namely the current layout configurations) conform to a current balancing design of the printed circuit board is determined according to at least one of a first tolerable difference value and a second tolerable difference value and an average current. The first tolerable difference value corresponds to the current of the first power supply component, and the second tolerable difference value corresponds to the current of the second power supply component.

When a determination result of the step S540 is "NO", Step S550 is continued; and when the determination result of the step S540 is "YES", the power copper surface configuration method is ended. In Step S550, the positions of the first power supply component, the second power supply component, the power sink component, the first power copper surface portion, the second power copper surface portion, the third power copper surface portion, the convergence copper surface portion, the first grounding copper surface portion and the second grounding copper surface portion may be readjusted (or reconfigured), and/or the first tolerable difference value and the second tolerable difference value may be increased. After the step S550, Step S520 is continued, so as to re-determine whether the convergence copper surface portion located at a new position/subjected to readjustment of the difference values conforms to the current balancing design of the printed circuit board.

Figure 6A:
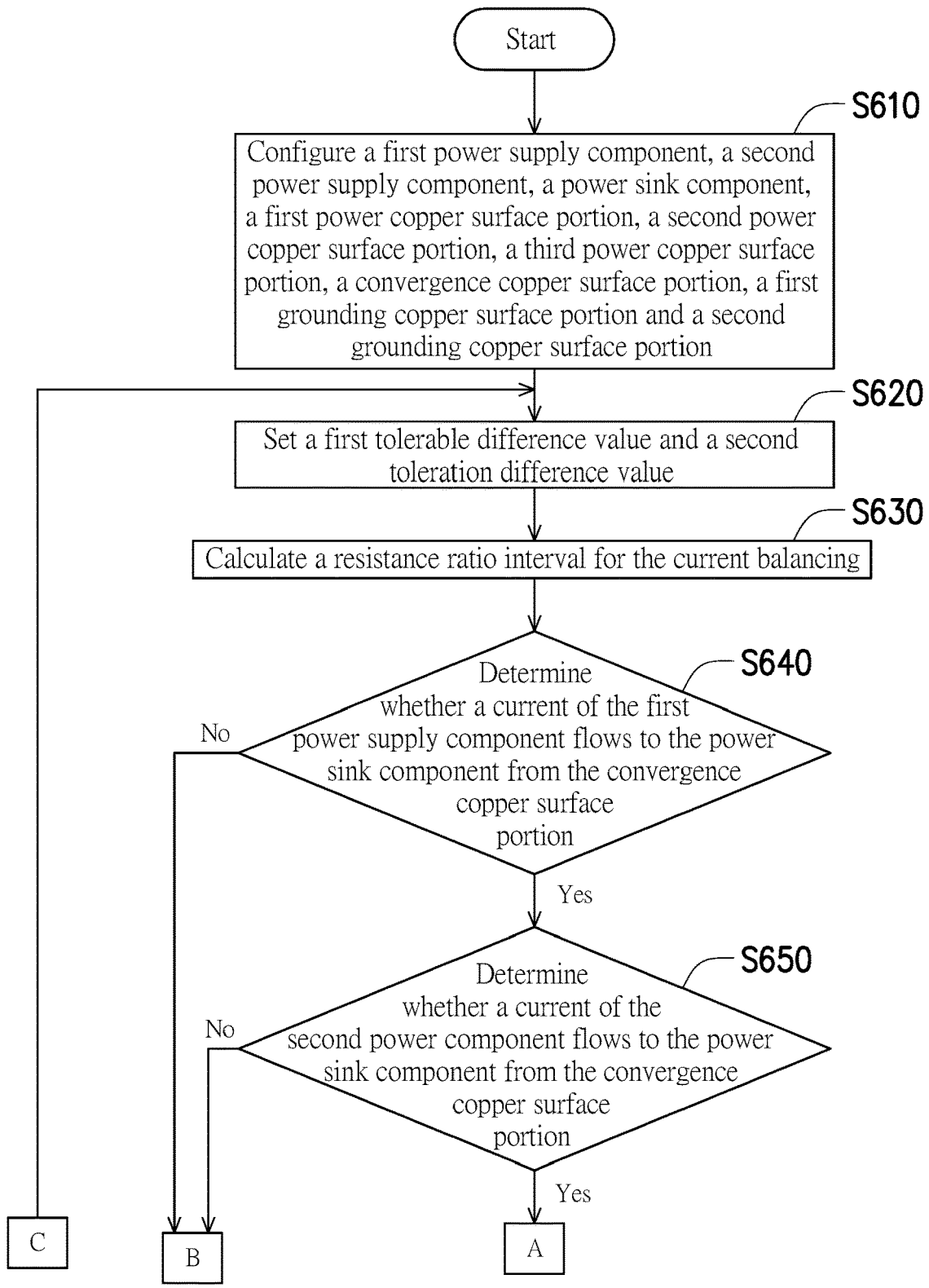
FIGS. 6A and 6B are a flowchart of a power copper surface configuration method of a printed circuit board according to another embodiment of the present invention.
Figure 6B:
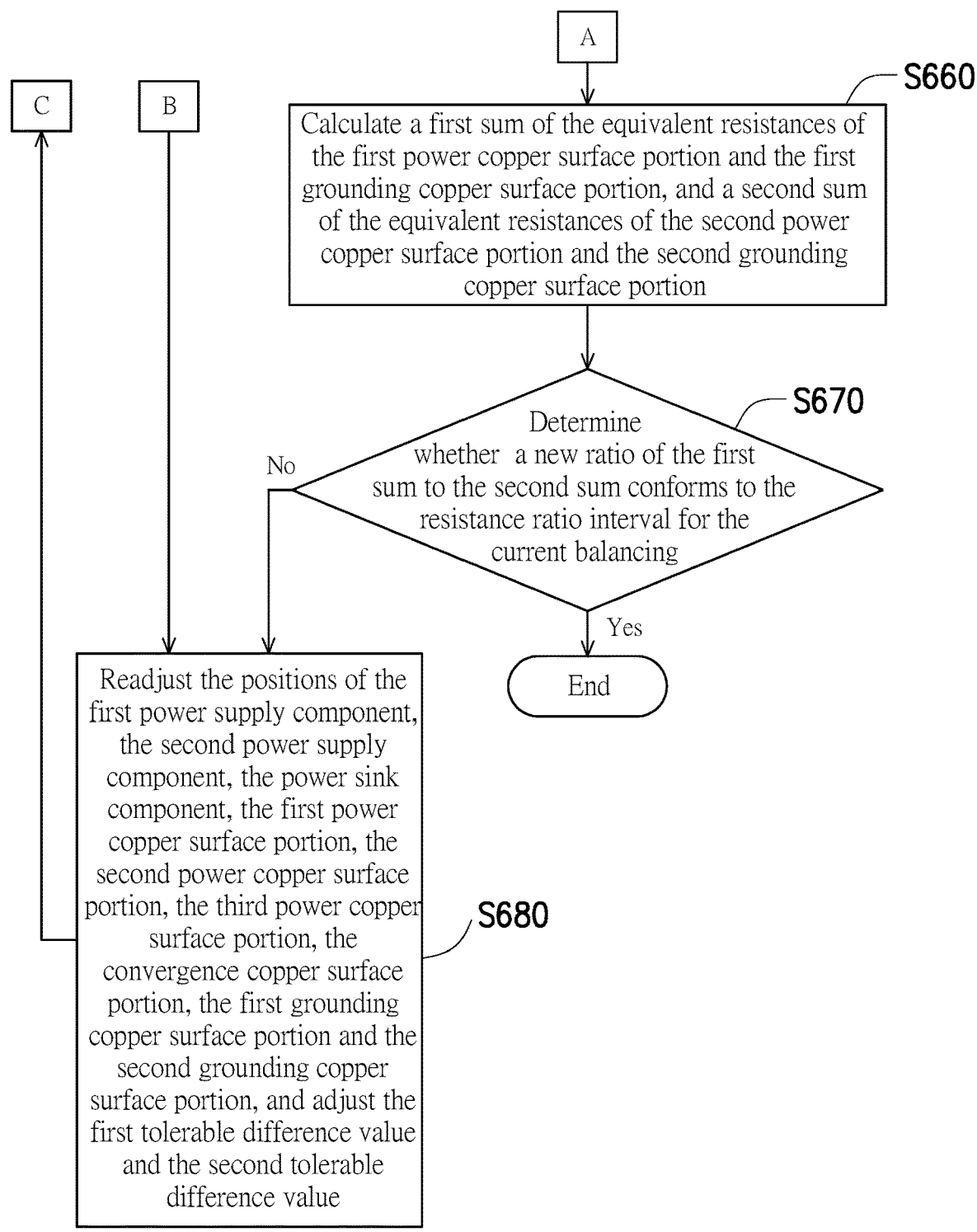

FIGS. 6A and 6B are a flowchart of a power copper surface configuration method of a printed circuit board according to another embodiment of the present invention. FIGS. 6A and 6B are used to further describe FIGS. 5A and 5B, but the embodiment of the present invention is not limited thereto. Referring to FIGS. 6A and 6B, in the present embodiment, the power copper surface configuration method includes the following steps. In Step S610, a first power supply component, a second power supply component, a power sink component, a first power copper surface portion, a second power copper surface portion, a third power copper surface portion, a convergence copper surface portion, a first grounding copper surface portion and a second grounding copper surface portion are configured at first. In Step S620, a first tolerable difference value and a second tolerable difference value are set at first. That is, under the condition that the current of the power sink component is constant, the absolute value of a tolerable maximum difference between the current of the first power supply component and an average current is set as the first tolerable difference value, and the absolute value of tolerable maximum difference between the current of the second power supply component and the average current is set as the second tolerable difference value.

In Step S630, a resistance ratio interval for the current balancing is calculated, which is a range of a ratio of a first sum to a second sum when the first tolerable difference value and the second tolerable difference value are satisfied, and serves as the norm for determining whether it confirms to the current balancing design. In Step S640, whether the current of the first power supply component flows to the power sink component from the convergence copper surface portion is determined. The convergence copper surface portion is electrically connected to the first power copper surface portion, the second power copper surface portion and the third power copper surface portion. If YES, Step S650 is continued. If NO, Step S680 is continued. In Step S680, the positions of the first power supply component, the second power supply component, the power sink component, the first power copper surface portion, the second power copper surface portion, the third power copper surface portion, the convergence copper surface portion, the first grounding copper surface portion and the second grounding copper surface portion may be readjusted (or reconfigured), and/or the first tolerable difference value and the second tolerable difference value may be increased.

In Step S650, whether the current of the second power supply component flows to the power sink component from the convergence copper surface portion is determined. If YES, Step S660 is continued. If NO, Step S680 is continued. In Step S660, a first sum of the equivalent resistances of the first power copper surface portion and the first grounding copper surface portion and a second sum of the equivalent resistances of the second power copper surface portion and the second grounding copper surface portion are calculated.

In Step S670, whether a new ratio of the first sum to the second sum conforms to the current ratio interval for the current balancing is determined. If YES, the power copper surface configuration method is ended. If NO, Step S680 is continued. After the step S680, Step S620 is continued, so as to re-determine whether the convergence copper surface portion located at a new position/subjected to readjustment of the difference values conforms to the current balancing design of the printed circuit board.

Figure 7A:
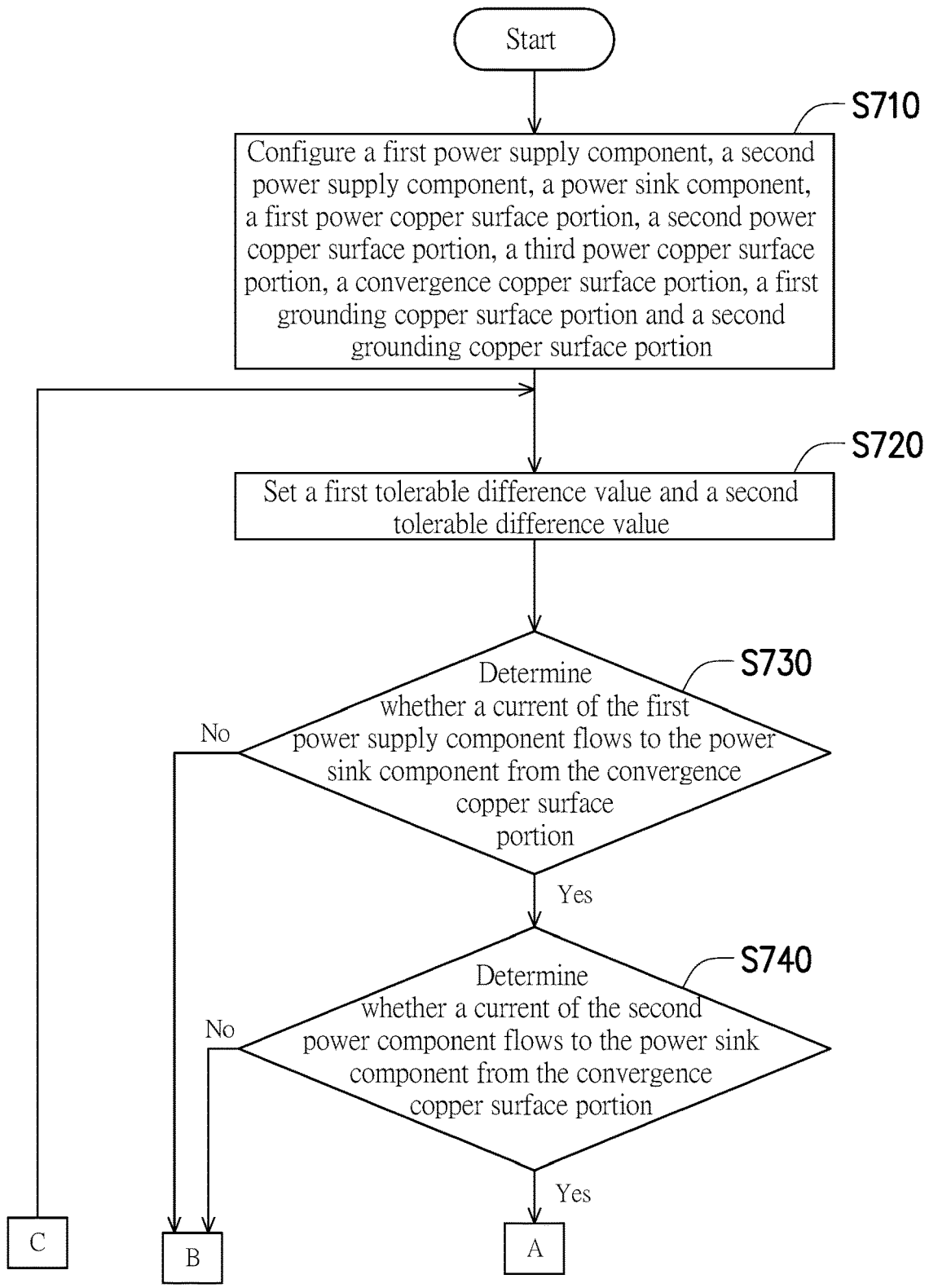
FIGS. 7A and 7B are a flowchart of a power copper surface configuration method of a printed circuit board according to a further embodiment of the present invention.
Figure 7B:
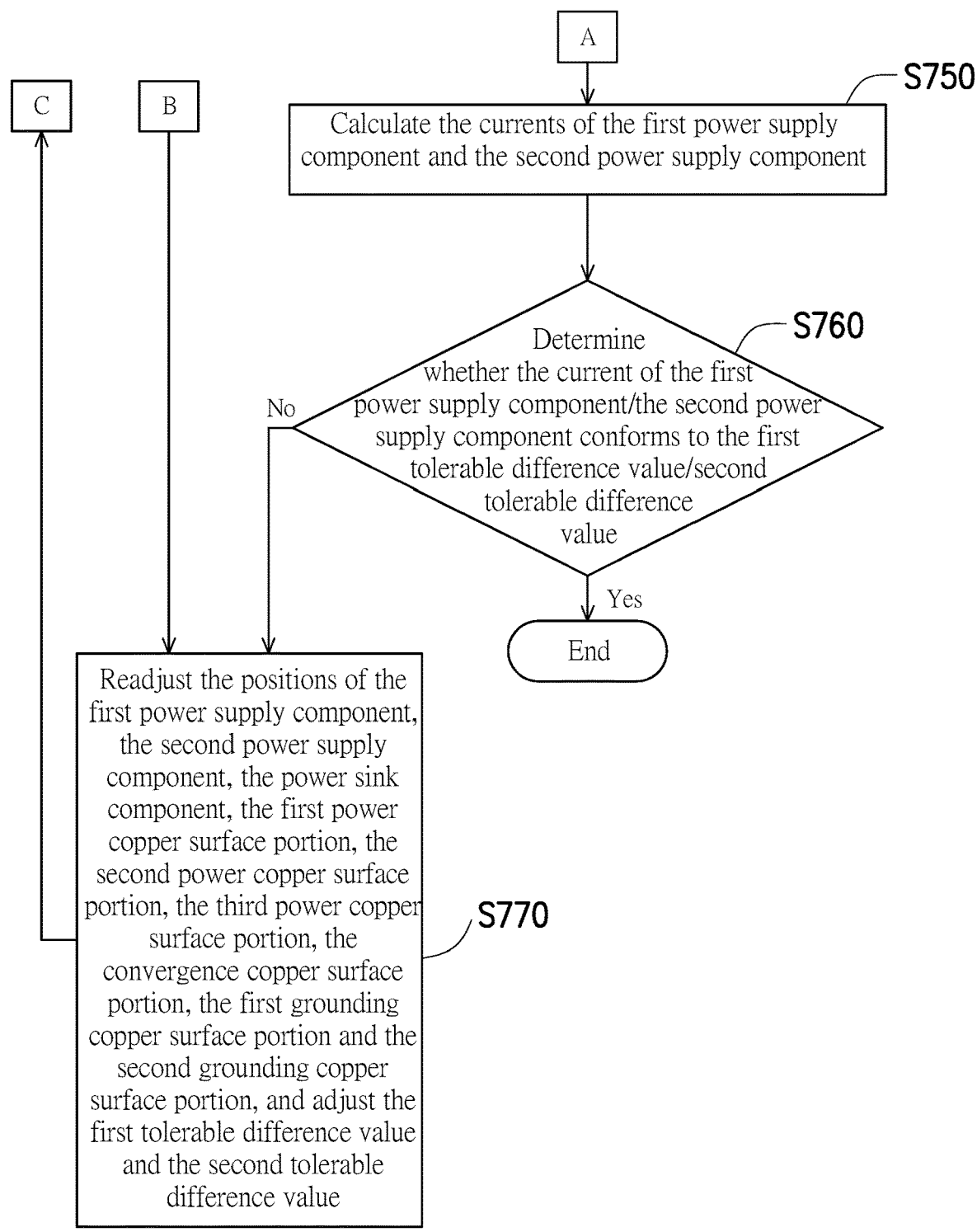

FIGS. 7A and 7B are a flowchart of a power copper surface configuration method of a printed circuit board according to a further embodiment of the present invention. FIGS. 7A and 7B are used to further describe FIGS. 5A and 5B, but the embodiment of the present invention is not limited thereto. Referring to FIGS. 7A and 7B, in the present embodiment, the power copper surface configuration method includes the following steps. In Step S710, a first power supply component, a second power supply component, a power sink component, a first power copper surface portion, a second power copper surface portion, a third power copper surface portion, a convergence copper surface portion, a first grounding copper surface portion and a second grounding copper surface portion are configured at first. In Step S720, a first tolerable difference value and a second tolerable difference value are set at first. That is, under the condition that the current of the power sink component is constant, the absolute value of a tolerable maximum difference between the current of the first power supply component and an average current is set as the first tolerable difference value, and the absolute value of a tolerable maximum difference between the current of the second power supply component and the average current is set as the second tolerable difference value.

In Step S730, whether the current of the first power supply component flows to the power sink component from the convergence copper surface portion is determined, and the convergence copper surface portion is electrically connected to the first power copper surface portion, the second power copper surface portion and the third power copper surface portion. If YES, Step S740 is continued. If NO, Step S770 is continued. In Step S770, the positions of the first power supply component, the second power supply component, the power sink component, the first power copper surface portion, the second power copper surface portion, the third power copper surface portion, the convergence copper surface portion, the first grounding copper surface portion and the second grounding copper surface portion may be readjusted (or reconfigured), and/or the first tolerable difference value and the second tolerable difference value may be increased.

In Step S740, whether the current of the second power supply component flows to the power sink component from the convergence copper surface portion is determined. If YES, Step S750 is continued. If NO, Step S770 is continued. In Step S750, the currents of the first power supply component and the second power supply component are calculated.

In Step S760, whether the current of the first power supply component/the second power supply component conforms to the first tolerable difference value/second tolerable difference value is determined. If YES, the power copper surface configuration method is ended. If NO, Step S770 is continued. After the step S770, Step S720 is continued, so as to re-determine whether the convergence copper surface portion located at a new position/subjected to readjustment of the difference values conforms to the current balancing design of the printed circuit board.

The order of the steps S510, S520, S530, S540, S550, S610, S620, S630, S640, S650, S660, S670, S680, S710, S720, S730, S740, S750, S760 and S770 is for the purpose of description, and the embodiment of the present invention is not limited thereto. Furthermore, the order of the steps S510, S520, S530, S540, S550, S610, S620, S630, S640, S650, S660, S670, S680, S710, S720, S730, S740, S750, S760 and S770 may reference the embodiments of FIGS. 1A to 1C, FIGS. 2A to 2C, FIG. 3, and FIGS. 4A to 4D, and descriptions thereof are omitted herein.

Based on the above, the printed circuit board and the power copper surface configuration method of the embodiments of the present invention may determine whether the convergence copper surface portion conforms to the current balancing design of the printed circuit board according to at least one of the first tolerable difference value and the second tolerable difference value and the average current. Therefore, the non-uniform condition of the output currents of the first power supply component and the second power supply component can be avoided or suppressed.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A printed circuit board, comprising:
   a first power supply component;
   a second power supply component;
   a power sink component;
   a first power copper surface portion, electrically connected to the first power supply component;
   a second power copper surface portion, electrically connected to the second power supply component;
   a third power copper surface portion, electrically connected to the power sink component;
   a convergence copper surface portion, electrically connected to the first power copper surface portion, the second power copper surface portion and the third power copper surface portion, wherein currents provided by the first power supply component and the second power supply component flow to the convergence copper surface portion via the first power copper surface portion and the second power copper surface portion, respectively and flow to the power sink component via the convergence copper surface portion;
   a first grounding copper surface portion, electrically connected to the first power supply component and the power sink component; and
   a second grounding copper surface portion, electrically connected to the second power supply component and the power sink component, wherein the first power supply component, the second power supply component, the power sink component, the first power copper surface portion, the second power copper surface portion, the third power copper surface portion, the convergence copper surface portion, the first grounding copper surface portion and the second grounding copper surface portion conform to a current balancing design of the printed circuit board,
   wherein when a first sum of equivalent resistances of the first power copper surface portion and the first grounding copper surface portion and a second sum of equivalent resistances of the second power copper surface portion and the second grounding copper surface portion satisfy the following inequality, the first power supply component, the second power supply component, the power sink component, the first power copper surface portion, the second power copper surface portion, the third power copper surface portion, the convergence copper surface portion, the first grounding copper surface portion and the second grounding copper surface portion confirm to the current balancing design:

$$\frac{\text{Average current} - \text{first tolerable difference value}}{\text{Average current} + \text{first tolerable difference value}} \leq$$

$$\frac{\text{First sum}}{\text{Second sum}} \leq \frac{\text{Average current} + \text{first tolerable difference value}}{\text{Average current} - \text{first tolerable difference value}}$$

$$\text{or } \frac{\text{Average current} - \text{second tolerable difference value}}{\text{Average current} + \text{second tolerable difference value}} \leq$$

$$\frac{\text{Second sum}}{\text{First sum}} \leq \frac{\text{Average current} + \text{second tolerable difference value}}{\text{Average current} - \text{second tolerable difference value}}$$

Where the first tolerable difference value corresponds to the current of the first power supply component, and the second tolerable difference value corresponds to the current of the second power supply component, or, when an absolute value of a difference value between the current of the first power supply component and an average current is less than or equal to the first tolerable difference value, and an absolute value of a difference value between the current of the second power supply component and the average current is less than or equal to the second tolerable difference value, the first power supply component, the second power supply component, the power sink component, the first power copper surface portion, the second power copper surface portion, the third power copper surface portion, the convergence copper surface portion, the first grounding copper surface portion and the second grounding copper surface portion conform to the current balancing design.

2. The printed circuit board according to claim 1, wherein the first power supply component, the second power supply component, the power sink component, the first power copper surface portion, the second power copper surface portion, the third power copper surface portion, the convergence copper surface portion, the first grounding copper surface portion and the second grounding copper surface portion conform to a layout design of the printed circuit board.

3. The printed circuit board according to claim 1, wherein when the first power supply component, the second power supply component and the power sink component are mounted by Dual In Line Package (DIP), the first power copper surface portion and the first power supply component are electrically connected on a first layer of printed circuit board; the second power copper surface portion is electrically connected to the second power supply component on the first layer of printed circuit board; the third power copper surface portion is electrically connected to the power sink component on a second layer of printed circuit board; the convergence copper surface portion is electrically connected to the first power copper surface portion and the second power copper surface portion on the first layer of printed circuit board; and the convergence copper surface portion is electrically connected to the third power copper surface portion through a plurality of via holes going through from the first layer of printed circuit board to the second layer of printed circuit board.

4. The printed circuit board according to claim 3, wherein the first grounding copper surface portion, the first power supply component, the second grounding copper surface portion, the second power supply component and the power sink component are electrically connected on a third layer of printed circuit board.

5. The printed circuit board according to claim 1, wherein when the first power supply component and the second power supply component are mounted by Dual In Line Package (DIP), and the power sink component is mounted by Surface Mount Technology (SMT), the first power copper surface portion is electrically connected to the first power supply component on a first layer of printed circuit board; the second power copper surface portion is electrically connected to the second power supply component on the first layer of printed circuit board; the third power copper surface portion located on a second layer of printed circuit board is electrically connected to the power sink component located on the first layer of printed circuit board through a plurality of first via holes going through from the first layer of printed circuit board to the second layer of printed circuit board; the convergence copper surface portion is electrically connected to the first power copper surface portion and the second power copper surface portion on the first layer of printed circuit board; and the convergence copper surface portion is electrically connected to the third power copper surface portion through a plurality of second via holes going through from the first layer of printed circuit board to the second layer of printed circuit board.

6. The printed circuit board according to claim 5, wherein the first grounding copper surface portion, the first power supply component, the second grounding copper surface portion and the second power supply component are electrically connected on a third layer of printed circuit board, and the first grounding copper surface portion and the second grounding copper surface portion are electrically connected to the power sink component through a plurality of third via holes going through from the first layer of printed circuit board to the third layer of printed circuit board.

7. The printed circuit board according to claim 1, wherein when the first power supply component, the second power supply component and the power sink component are mounted by SMT, the first power copper surface portion is electrically connected to the first power supply component on a first layer of printed circuit board; the second power copper surface portion is electrically connected to the second power supply component on the first layer of printed circuit board; the third power copper surface portion is electrically connected to the power sink component on the first layer of printed circuit board; and the convergence copper surface portion, the first power copper surface portion, the second power copper surface portion and the third power copper surface portion are electrically connected on the first layer of printed circuit board.

8. The printed circuit board according to claim 1, wherein when the first power supply component, the second power supply component and the power sink component are mounted by SMT, each of the first power copper surface portion and the second power copper surface portion comprises a plurality of copper surfaces located on a first layer of printed circuit board and a second layer of printed circuit board and electrically connected with one another, and the third power copper surface portion comprises a plurality of copper surfaces located on the second layer of printed circuit board and a third layer of printed circuit board and electrically connected with one another; the first power copper surface portion, the first power supply component, the second power copper surface portion and the second power supply component are electrically connected on the first layer of printed circuit board; the convergence copper surface portion, the first power copper surface portion, the second power copper surface portion and the third power copper surface portion are electrically connected on the second layer of printed circuit board; and the third power copper surface portion is electrically connected to the power sink component on the third layer of printed circuit board.

9. The printed circuit board according to claim 8, wherein each of the first grounding copper surface portion and the second grounding copper surface portion comprises a plurality of copper surfaces located on the first layer of printed circuit board, a fourth layer of printed circuit board and the third layer of printed circuit board and electrically connected with one another; the first grounding copper surface portion is electrically connected to the first power supply component on the first layer of printed circuit board; the first grounding copper surface portion is electrically connected to the power sink component on the third layer of printed circuit board; the second grounding copper surface portion is electrically connected to the second power supply component on the first layer of printed circuit board; and the second grounding copper surface portion is electrically connected to the power sink component on the third layer of printed circuit board.

10. The printed circuit board according to claim 1, wherein when the first power supply component, the second power supply component and the power sink component are mounted by DIP, each of the first power copper surface portion and the second power copper surface portion comprises a plurality of copper surfaces located on a first layer of printed circuit board, a second layer of printed circuit board and a third layer of printed circuit board and electrically connected with one another, and the third power copper surface portion comprises a plurality of copper surfaces located on the first layer of printed circuit board, the second layer of printed circuit board and the third layer of printed circuit board and electrically connected with one another; the first power copper surface portion, the first power supply component, the second power copper surface portion and the second power supply component are electrically connected on the first layer of printed circuit board and the third layer of printed circuit board; the convergence copper surface portion, the first power copper surface portion, the second power copper surface portion and the third power copper surface portion are electrically connected on the second layer of printed circuit board; and the third power copper surface portion is electrically connected to the power sink component on the first layer of printed circuit board and the third layer of printed circuit board.

11. The printed circuit board according to claim 10, wherein each of the first grounding copper surface portion and the second grounding copper surface portion comprises a plurality of copper surfaces located on the second layer of printed circuit board, the third layer of printed circuit board and a fourth layer of printed circuit board and electrically connected with one another; the first grounding copper surface portion is electrically connected to the first power supply component on the second layer of printed circuit board and the fourth layer of printed circuit board; the first grounding copper surface portion is electrically connected to the power sink component on the second layer of printed circuit board and the fourth layer of printed circuit board; the second grounding copper surface portion is electrically connected to the second power supply component on the second layer of printed circuit board and the fourth layer of printed circuit board; and the second grounding copper surface portion is electrically connected to the power sink component on the second layer of printed circuit board and the fourth layer of printed circuit board.

12. A power copper surface configuration method of a printed circuit board, wherein the printed circuit board comprises a first power copper surface portion electrically connected to a first power supply component, a second power copper surface portion electrically connected to a second power supply component, a third power copper surface portion electrically connected to a power sink component, a first grounding copper surface portion electrically connected to the first power supply component and the power sink component, and a second grounding copper surface portion electrically connected to the second power supply component and the power sink component, and the power copper surface configuration method comprises:

configuring the first power supply component, the second power supply component, the power sink component, the first power copper surface portion, the second power copper surface portion, the third power copper surface portion, a convergence copper surface portion, the first grounding copper surface portion and the second grounding copper surface portion;

determining whether a current of the first power supply component flows to the power sink component from the convergence copper surface portion, the convergence copper surface portion being electrically connected to the first power copper surface portion, the second power copper surface portion and the third power copper surface portion;

determining whether a current of the second power supply component flows to the power sink component from the convergence copper surface portion;

when the currents of the first power supply component and the second power supply component both flow to the power sink component via the convergence copper surface portion, determining whether the first power supply component, the second power supply component, the power sink component, the first power copper surface portion, the second power copper surface portion, the third power copper surface portion, the convergence copper surface portion, the first grounding copper surface portion and the second grounding copper surface portion conform to a current balancing design of the printed circuit board according to at least one of a first tolerable difference value and a second tolerable difference value and an average current, wherein the first tolerable difference value corresponds to the current of the first power supply component, and the second tolerable difference value corresponds to the current of the second power supply component;

when the first power supply component, the second power supply component, the power sink component, the first power copper surface portion, the second power copper surface portion, the third power copper surface portion, the convergence copper surface portion, the first grounding copper surface portion and the second grounding copper surface portion conform to the current balancing design of the printed circuit board, ending the power copper surface configuration method.

13. The power copper surface configuration method according to claim 12, further comprising: when the first power supply component, the second power supply component, the power sink component, the first power copper surface portion, the second power copper surface portion, the third power copper surface portion, the convergence copper surface portion, the first grounding copper surface portion and the second grounding copper surface portion do not conform to the current balancing design of the printed circuit board, performing at least one of the following steps: reconfiguring the positions of the first power supply component, the second power supply component, the power sink component, the first power copper surface portion, the second power copper surface portion, the third power copper surface portion, the convergence copper surface portion, the first grounding copper surface portion and the second grounding copper surface portion, and increasing the first tolerable difference value and the second tolerable difference value.

14. The power copper surface configuration method according to claim 12, wherein the step of determining whether the first power supply component, the second power supply component, the power sink component, the first power copper surface portion, the second power copper surface portion, the third power copper surface portion, the convergence copper surface portion, the first grounding copper surface portion and the second grounding copper surface portion conform to the current balancing design of the printed circuit board according to at least one of the first tolerable difference value and the second tolerable difference value and the average current comprises:

calculating a first sum of equivalent resistances of the first power copper surface portion and the first grounding copper surface portion and a second sum of equivalent resistances of the second power copper surface portion and the second grounding copper surface portion;

determining whether a ratio of the first sum to the second sum conforms to a current balancing resistance ratio according to the following inequality:

$$\frac{\text{Average current} - \text{first tolerable difference value}}{\text{Average current} + \text{first tolerable difference value}} \leq$$

$$\frac{\text{First sum}}{\text{Second sum}} \leq \frac{\text{Average current} + \text{first tolerable difference value}}{\text{Average current} - \text{first tolerable difference value}}$$

or $\frac{\text{Average current} - \text{second tolerable difference value}}{\text{Average current} + \text{second tolerable difference value}} \leq$ $$\frac{\text{Second sum}}{\text{First sum}} \leq \frac{\text{Average current} + \text{second tolerable difference value}}{\text{Average current} - \text{second tolerable difference value}}$$

when the ratio of the first sum to the second sum satisfies the current balancing resistance ratio, the first power supply component, the second power supply component, the power sink component, the first power copper surface portion, the second power copper surface portion, the third power copper surface portion, the convergence copper surface portion, the first grounding copper surface portion and the second grounding copper surface portion conform to the current balancing design of the printed circuit board; and when the ratio of the first sum to the second sum does not satisfy the current balancing resistance ratio, the first power supply component, the second power supply component, the power sink component, the first power copper surface portion, the second power copper surface portion, the third power copper surface portion, the convergence copper surface portion, the first grounding copper surface portion and the second grounding copper surface portion do not conform to the current balancing design of the printed circuit board.

15. The power copper surface configuration method according to claim 12, wherein the step of determining whether the first power supply component, the second power supply component, the power sink component, the first power copper surface portion, the second power copper surface portion, the third power copper surface portion, the convergence copper surface portion, the first grounding copper surface portion and the second grounding copper surface portion conform to the current balancing design of the printed circuit board according to at least one of the first tolerable difference value and the second tolerable difference value and the average current comprises:

when an absolute value of a difference value between the current of the first power supply component and the average current is less than or equal to the first tolerable difference value, and an absolute value of a difference value between the current of the second power supply component and the average current is less than or equal to the second tolerable difference value, determining that the first power supply component, the second power supply component, the power sink component, the first power copper surface portion, the second power copper surface portion, the third power copper surface portion, the convergence copper surface portion, the first grounding copper surface portion and the second grounding copper surface portion conform to the current balancing design of the printed circuit board; and when the absolute value of the difference value between the current of the first power supply component and the average current is greater than the first tolerable difference value, or the absolute value of the difference value between the current of the second power supply component and the average current is greater than the second tolerable difference value, determining that the first power supply component, the second power supply component, the power sink component, the first power copper surface portion, the second power copper surface portion, the third power copper surface portion, the convergence copper surface portion, the first grounding copper surface portion and the second grounding copper surface portion do not conform to the current balancing design of the printed circuit board.

* * * * *